(12) United States Patent
Huang et al.

(10) Patent No.: US 12,176,774 B2
(45) Date of Patent: Dec. 24, 2024

(54) SIDE-BY-SIDE PHASE WINDING, STATOR AND MOTOR

(71) Applicants: CHONGQING ZONGSHEN ELECTRIC POWER TECHNOLOGY CO. LTD, Chongqing (CN); CHONGQING ZONGSHEN INNOVATION TECHNOLOGY RESEARCH INSTITUTE CO. LTD, Chongqing (CN)

(72) Inventors: Chaodong Huang, Chongqing (CN); Junshan Shao, Chongqing (CN)

(73) Assignees: CHONGQING ZONGSHEN ELECTRIC POWER TECHNOLOGY CO. LTD., Chongqing (CN); CHONGQING ZONGSHEN INNOVATION TECHNOLOGY RESEARCH INSTITUTE CO. LTD, Chongqing (CN)

( * ) Notice: Subject to any disclaimer, the term of this patent is extended or adjusted under 35 U.S.C. 154(b) by 302 days.

(21) Appl. No.: 17/707,104

(22) Filed: Mar. 29, 2022

(65) Prior Publication Data
US 2022/0216759 A1    Jul. 7, 2022

Related U.S. Application Data

(63) Continuation of application No. PCT/CN2020/129568, filed on Nov. 17, 2020.

(30) Foreign Application Priority Data

Dec. 31, 2019 (CN) .................. 201911409356.X

(51) Int. Cl.
*H02K 3/28* (2006.01)
*H02K 1/16* (2006.01)

(52) U.S. Cl.
CPC .............. *H02K 3/28* (2013.01); *H02K 1/16* (2013.01); *H02K 2213/03* (2013.01)

(58) Field of Classification Search
CPC ........ H02K 3/28; H02K 1/16; H02K 2213/03; H02K 3/50; H02K 3/12; Y02T 10/64
See application file for complete search history.

(56) References Cited

U.S. PATENT DOCUMENTS

| | | | |
|---|---|---|---|
| 2003/0132680 A1* | 7/2003 | Nakamura | H02K 3/28 310/180 |
| 2019/0149001 A1* | 5/2019 | Lee | H02K 3/12 310/201 |
| 2021/0296956 A1* | 9/2021 | Eilenberger | H02K 3/48 |

FOREIGN PATENT DOCUMENTS

| | | |
|---|---|---|
| CN | 1499694 A | 5/2004 |
| CN | 109586453 A | 4/2019 |

(Continued)

OTHER PUBLICATIONS

International Search Report and Written Opinion issued in corresponding PCT Application No. PCT/CN2020/129568, dated Feb. 19, 2021.

*Primary Examiner* — Thomas Truong
(74) *Attorney, Agent, or Firm* — Westbridge IP LLC

(57) ABSTRACT

Disclosed are a side-by-side phase winding, a stator and a motor. The side-by-side phase winding comprises two coil ring groups each consisting of Q coil rings, each coil ring being formed by connecting in series P hairpin conductor groups uniformly distributed in the circumferential direction; each hairpin conductor group comprises two hairpin conductors which are arranged in a staggered manner in the circumferential direction of the stator, each hairpin conductor comprises a hairpin main body which is integrally bent into a U-shape, the hairpin main body comprises two leg parts, a head part and support feet, and adjacent leg parts on (Continued)

the two hairpin conductors arranged in a staggered manner are located in two adjacent slots; and the Q coil rings in each coil ring group are arranged in Q circumferentially continuous adjacent slots of the stator.

9 Claims, 16 Drawing Sheets

(56) References Cited

FOREIGN PATENT DOCUMENTS

| | | |
|---|---|---|
| CN | 208835872 U | 5/2019 |
| CN | 110611387 A | 12/2019 |
| CN | 110912310 A | 3/2020 |
| CN | 210867326 U | 6/2020 |
| JP | 2016032392 A | 3/2016 |

* cited by examiner

SIDE-BY-SIDE PHASE WINDING, STATOR AND MOTOR

CROSS-REFERENCE TO RELATED APPLICATIONS

The present application is a continuation of International Application No. PCT/CN2020/129568, filed on Nov. 17, 2020, which claims priority to Chinese Patent Application No. 201911409356.X, filed on Dec. 31, 2019. The disclosures of the aforementioned applications are incorporated for reference.

TECHNICAL FIELD

The present application relates to the technical field of flat wire motors, and in particular to a side-by-side phase winding, a stator and a motor.

BACKGROUND

A motor (including an electric motor and a generator) is a device that converts electrical energy into mechanical energy (or converts mechanical energy into electrical energy) according to the principle of electromagnetic induction, and can be used as a power source or a power generation device for various electrical appliances such as household appliances, various machinery such as electric vehicles and electrical cars. The motor can be classified into a direct current motor and an alternating current motor according to the type of a working power source supplied to the motor, and the alternating current motor can be further divided into a single-phase motor and a multi-phase motor (such as a three-phase motor, etc.). The motor includes a stator and a rotor, and a winding is provided in a stator iron core slot of the stator. The conventional winding is made of round wires by winding. Although the winding process is relatively simple, the space utilization in the iron core slot is low, the waste of useless copper at an end is large, and the power density is low, so the round wire is gradually replaced by a flat copper wire or a rectangular-section cooper wire.

At present, the winding of the flat copper wire or the rectangular-section cooper wire is mainly formed by connecting segmented hairpin conductors each of which as a whole is bent into a U-shape. When short-distance windings are used, support leg parts of hairpin conductors of two or more circuits of phase windings are arranged in a same stator iron core slot. Due to the different voltages between different phase windings, when the motor is running, there is a voltage difference between the support leg parts of adjacent different phase windings in the same slot. This voltage difference is likely to damage the insulating varnish of the flat copper wire material used for the hairpin conductor, thereby affecting the service life of the motor. The arrangement of the hairpin conductors in the phase winding affects positions of the support leg parts of different phase windings in the slot. In conventional technology, in order to minimize the influence of this voltage difference, a wide variety of hairpin conductor structures are often used to realize the winding structure of the phase windings. Therefore, the hairpin conductors of this winding structure have many shapes, high production cost, and are difficult to assemble, which is not conducive to production.

SUMMARY

In view of the disadvantages of the above conventional technology, the technical problems to be solved by the present application is how to provide a side-by-side phase winding, a stator and a motor with few types of hairpin conductors and reasonable structural arrangement, which can reduce the adjoining area of inter-phase conductors in the same slot, help to reduce the probability of inter-phase discharge, prolong the service life of the motor, and are easy to product.

In order to solve the above technical problems, technical solutions are provided in the present application as follows.

A side-by-side phase winding includes two coil ring groups each consisting of Q coil rings. Each of the coil rings is formed by connecting in series P hairpin conductor groups evenly distributed along a circumferential direction of the stator. P is the number of pole pairs. Q is the number of slots per pole and phase, and is an integer greater than 1. The hairpin conductor group includes at least two hairpin conductors that are arranged in a staggered manner in the circumferential direction of the stator, the hairpin conductor includes a hairpin body which as a whole is bent into a U-shape, the hairpin body includes two support leg parts arranged in parallel and a head portion connected to one end of the two support leg parts, and the two support leg parts are each provided with a support foot at another end. Adjacent support leg parts on the hairpin conductors which are arranged in a staggered manner in the circumferential direction of the stator in the hairpin conductor group are located in two adjacent slots.

The Q coil rings in each group of the coil rings are arranged in the consecutive adjacent Q slots in the circumferential direction of the stator; in a clockwise direction, the hairpin conductor group on the coil ring in the Ath slot in one coil ring group and the hairpin conductor group on the coil ring in the Ath slot in another coil ring group are arranged in a staggered manner in the circumferential direction of the stator. In this way, adjacent hairpin conductors in the two hairpin conductor groups that are arranged in a staggered manner from each other on the two coil rings are arranged side by side in a radial direction of the stator to be closely adjacent to each other.

In order to ensure that the support leg parts of the hairpin conductors evenly fill up the stator iron core slots, the relative positions of the support leg parts of each hairpin conductor group in the stator iron core slot are the same. Since the hairpin conductor groups on the coil rings at the corresponding positions on the respective coil ring groups in the clockwise direction are arranged in a staggered manner, adjacent hairpin conductors in the two staggered hairpin conductor groups are arranged side by side and close to each other in the radial direction of the stator. In this way, the support leg parts of the hairpin conductor groups on the two coil rings are mutually filled in the same slot, and finally the support leg parts belonging to the same phase in each slot are sequentially arranged close to each other along one side of the slot. Even if support leg parts belonging to two different phases are arranged in the same slot, the two are adjacent to each other only at one side, which greatly reduces the adjoining area of inter-phase conductors, is conducive to reducing the probability of inter-phase discharge, and prolonging the service life of the motor. Moreover, because the types of hairpin conductors on each hairpin conductor group are the same, as long as the types of hairpin conductors on each hairpin conductor group are determined, the types of hairpin conductors on the whole phase winding can be determined, and the use of other types of hairpin conductors is avoided, so that the types of hairpin conductors are reduced. In addition, since the head portions of different types of hairpin conductors are arranged side by side and close to each other in the radial direction of the stator, the above different types of hairpin conductors can be formed by the same group of molds, thereby improving production efficiency and reducing cost.

Further, in an assembly state, 2N support leg parts are arranged in each stator core slot, and N is two or an odd number greater than two.

As an optimization, in the assembly state, four support leg parts are arranged in each stator iron core slot, and the hairpin conductor group includes two hairpin conductors. One hairpin conductor is a wave-like conductor with two support feet skewed and bent away from each other in a width direction of the hairpin body. The other hairpin conductor is an integrally annular O-shaped conductor, two support feet of the O-shaped conductor are skewed and bent toward the middle portion in the width direction of the hairpin body, and are spaced apart in a staggered manner in a thickness direction of the hairpin body; two adjacent support leg parts of the wave-like conductor and the O-shaped conductor are located in adjacent slots, and the other support leg parts of the wave-like conductor and the O-shaped conductor face away from each other.

As an optimization, in the assembly state, six support leg parts are arranged in each stator iron core slot, and the hairpin conductor group includes three hairpin conductors. One hairpin conductor is the wave-like conductor with two support feet skewed and bent away from each other in the width direction of the hairpin body. Each of the rest two hairpin conductors is the integrally annular O-shaped conductor, two support feet of the O-shaped conductor are skewed and bent toward the middle portion in the width direction of the hairpin body, and are spaced apart in a staggered manner in the thickness direction of the hairpin body; the two O-shaped conductors are arranged side by side and spaced apart from each other in the radial direction of the stator; two adjacent support leg parts of the wave-like conductor and the O-shaped conductor are located in adjacent slots, and the other support leg parts of the wave-like conductor and the O-shaped conductor face away from each other.

As an optimization, in the assembly state, six support leg parts are arranged in each stator iron core slot, and the hairpin conductor group includes three hairpin conductors. One hairpin conductor is the integrally annular O-shaped conductor. The rest two hairpin conductors are first-type skewed U-shaped conductor and second-type skewed U-shaped conductor arranged side by side and spaced apart from each other in the radial direction of the stator. A support foot on one support leg part of the first-type skewed U-shaped conductor and a support foot on another support leg part of the second-type skewed U-shaped conductor are skewed and bent away from each other in a width direction of the hairpin body, and another two support feet of the first-type skewed U-shaped conductor and the second-type skewed U-shaped conductor are bent toward each other in the width direction of the hairpin body and are connected with each other; two support feet of the O-shaped conductor are skewed and bent toward the middle portion in the width direction of the hairpin body, and are spaced apart in a staggered manner in the thickness direction of the hairpin body; adjacent support leg parts of the first-type skewed U-shaped conductor, the second-type skewed U-shaped conductor, and the O-shaped conductor are located in adjacent slots.

As an optimization, in the assembly state, ten support leg parts are arranged in each stator iron core slot, and the hairpin conductor group includes two first-type skewed U-shaped conductors arranged side by side and spaced apart from each other in the radial direction of the stator, two second-type skewed U-shaped conductors arranged side by side and spaced apart from each other in the radial direction of the stator, and one wave-like conductor arranged side by side and spaced apart from the first-type skewed U-shaped conductor or the second-type skewed U-shaped conductor in the radial direction of the stator; two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in the width direction of the hairpin body, and two support feet of the second-type skewed U-shaped conductor are skewed and bent toward the first-type skewed U-shaped conductor in the width direction of the hairpin body.

As an optimization, in the assembly state, ten support leg parts are arranged in each stator iron core slot, and the hairpin conductor group includes the first-type skewed U-shaped conductor and the second-type skewed U-shaped conductor which are arranged in a staggered manner in the circumferential direction of the stator. Two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in the width direction of the hairpin body, and two support feet of the second-type skewed U-shaped conductor are skewed and bent toward the first-type skewed U-shaped conductor in the width direction of the hairpin body. The hairpin conductor group further includes the wave-like conductor arranged side by side and spaced apart from the first-type skewed U-shaped conductor or the second-type skewed U-shaped conductor in the radial direction of the stator, and two O-shaped conductors which are spaced apart from the second-type skewed U-shaped conductor or the first-type skewed U-shaped conductor in the radial direction of the stator. The two O-shaped conductors are respectively located on two sides of the second-type skewed U-shaped conductor or the first-type skewed U-shaped conductor.

A stator includes a stator iron core and multiple circuits of side-by-side phase windings according to the above description mounted on the stator iron core, connecting ends of multiple circuits of the side-by-side phase windings for connecting with a power supply are respectively connected with power supply terminals, and connecting ends of multiple circuits of the phase windings for connecting with a star point are welded by a star point connecting conductor.

A motor includes the above stator.

To sum up, the present application has the advantage of few types of hairpin conductors and reasonable structural arrangement, which can reduce the adjoining area of inter-phase conductors in the same slot, help to reduce the probability of inter-phase discharge, prolong the service life of the motor, and are easy to product.

DETAILED DESCRIPTION OF THE EMBODIMENTS

Hereinafter, the present application is explained in further detail in conjunction with specific embodiments.

First Embodiment

As shown in FIGS. 1 to 15, a motor includes a stator, the stator includes a stator iron core 8 and three circuits of phase windings mounted on the stator iron core 8, one end of each branch on phase windings is connected to each other by a star point connecting conductor 7, and another ends of two parallel branches on each phase winding are connected in parallel by a power supply lead-out conductor 6.

The stator iron core 8 includes an integrally cylindrical main body, multiple stator iron core slots opening radially inward are circumferentially defined in an inner ring of the stator iron core 8, and a lower end of each stator iron core slot is an insertion side (also called a coronal side), and an upper end of each stator iron core slot is a connection side.

In this embodiment, the number of slots per pole and phase is Q, Q=2, the number of pole pairs is P, P=4. In the assembly state, four support leg parts are arranged in each stator iron core slot, that is, each phase winding includes two coil ring groups each consisting of two coil rings which respectively are a coil ring group a and a coil ring group b; the coil ring group a includes a coil ring a1 and a coil ring a2 arranged in sequence in the clockwise direction, and the coil ring a1 and the coil ring a2 are located in two consecutively adjacent slots in the circumferential direction of the stator. The coil ring group b includes a coil ring b1 and a coil ring b2 arranged in sequence in the clockwise direction, and the coil ring b1 and the coil ring b2 are also located in two consecutively adjacent slots in the circumferential direction of the stator.

Figure 1:
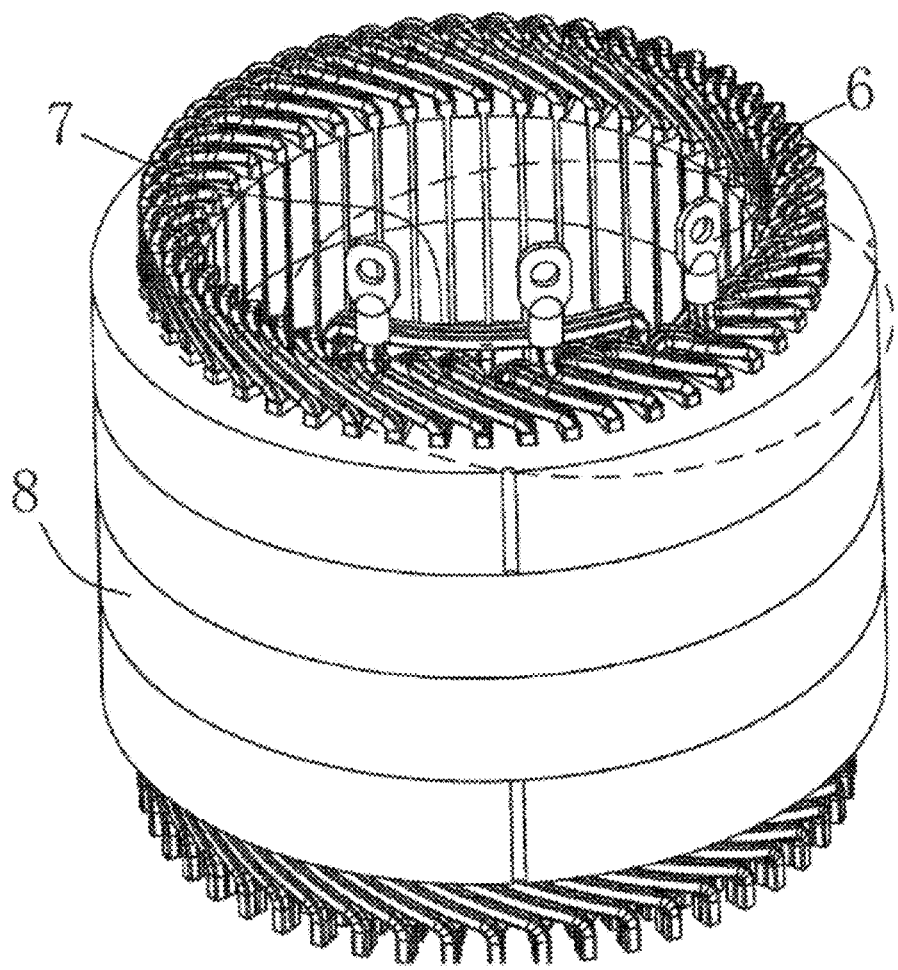
FIG. 1 is a schematic structural view of a stator in a first embodiment.
Figure 2:
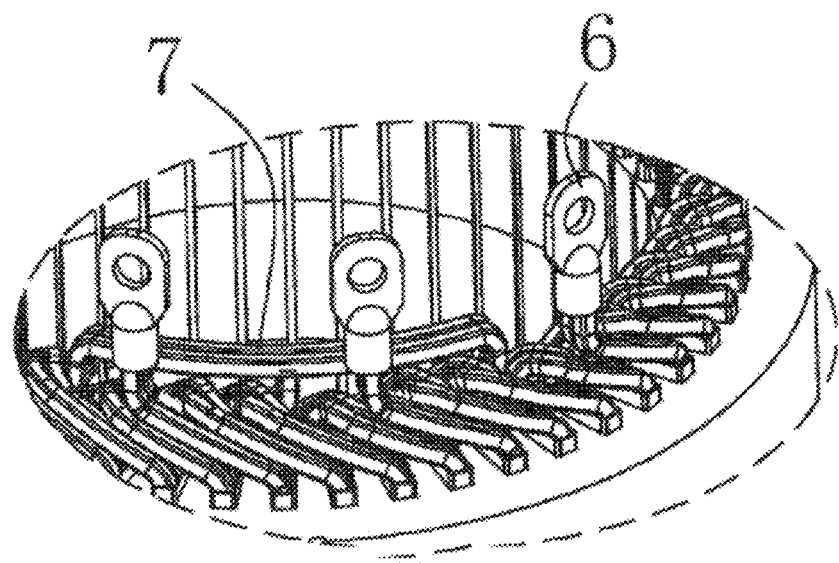
FIG. 2 is an enlarged schematic structural view at a circle in FIG. 1.
Figure 3:
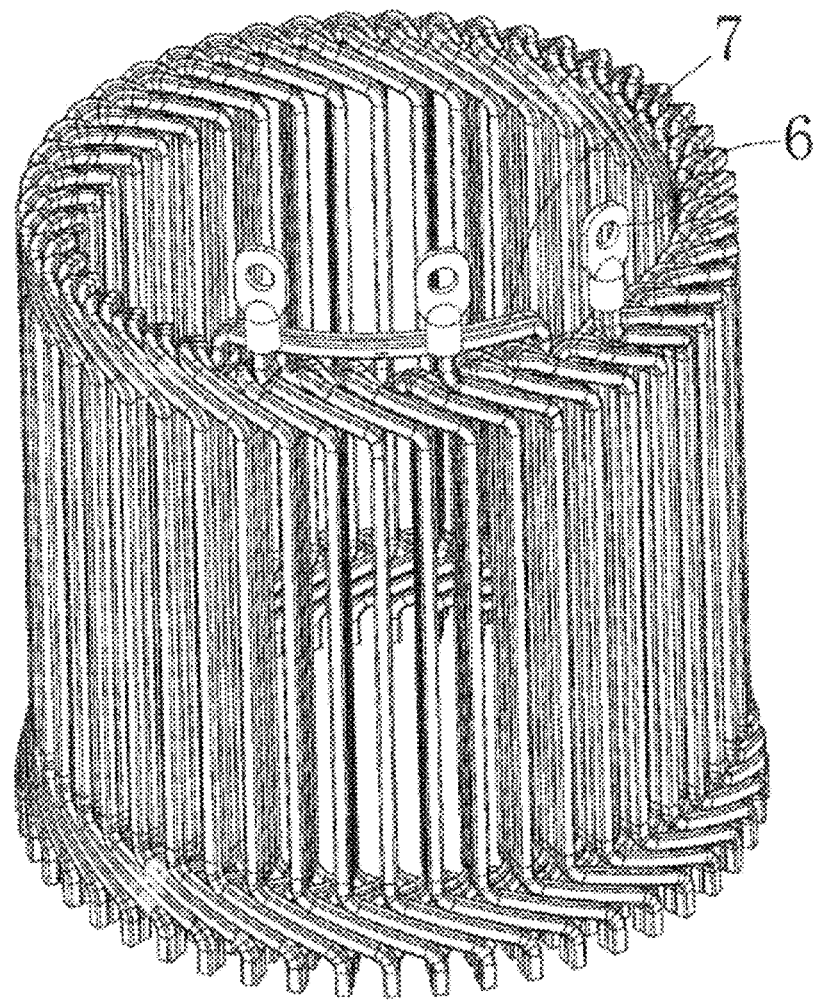
FIG. 3 is a schematic structural view of three-phase windings in the first embodiment.
Figure 4:
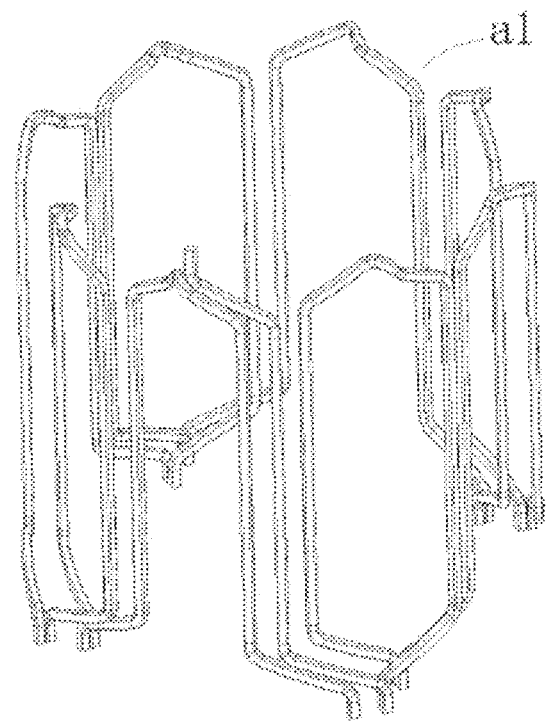
FIG. 4 is a schematic structural view of coil ring a1 in the first embodiment.
Figure 5:
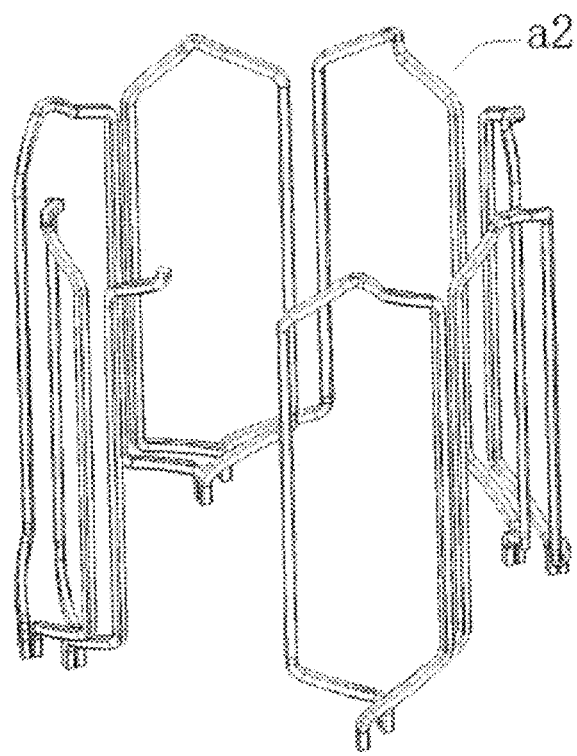
FIG. 5 is a schematic structural view of coil ring a2 in the first embodiment.

The coil rings a1, a2, b1 and b2 are all formed by connecting in series four hairpin conductor groups evenly distributed along the circumferential direction of the stator, as shown in FIG. 4 and FIG. 5.

Figure 6:
FIG. 6 is a schematic structural view of a wave-like conductor in the first embodiment.
Figure 7:
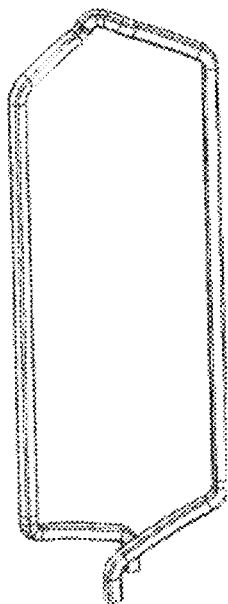
FIG. 7 is a schematic structural view of an O-shaped conductor in the first embodiment.
Figure 8:
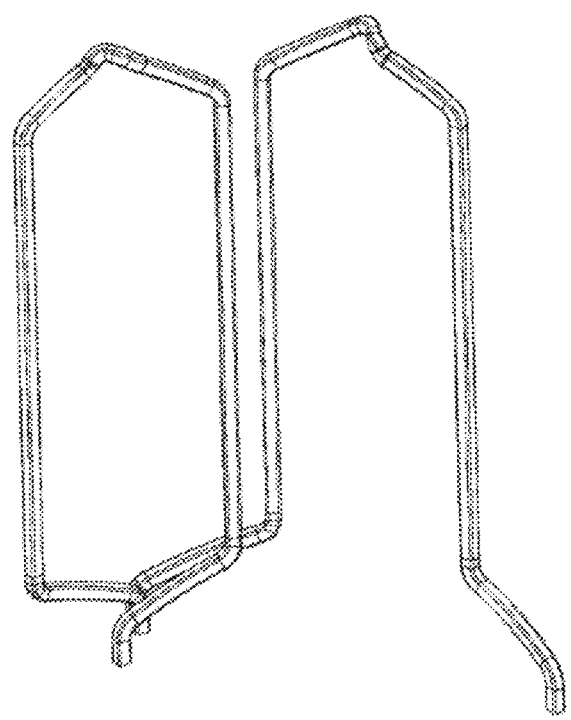
FIG. 8 is a schematic structural view of a hairpin conductor group in the first embodiment.

The hairpin conductor group includes two hairpin conductors that are arranged in a staggered manner in the circumferential direction of the stator. One hairpin conductor is a wave-like conductor, and the other hairpin conductor is an integrally annular O-shaped conductor. The wave-like conductor and the O-shaped conductor each include a hairpin body which as a whole is bent into a U-shape, the hairpin body includes two support leg parts arranged in parallel and a head part connected to one end of the two support leg parts, and the two support leg parts are each provided with a support foot at another end. Two support feet of the wave-like conductor are skewed and bent away from each other in a width direction of the hairpin body, as shown in FIG. 6. Two support feet of the O-shaped conductor are skewed and bent toward the middle portion in the width direction of the hairpin body, and are spaced apart in a staggered manner in a thickness direction of the hairpin body, as shown in FIG. 7. Two adjacent support leg parts of the wave-like conductor and the O-shaped conductor are located in two adjacent slots respectively, and the other support leg parts of the wave-like conductor and the O-shaped conductor face away from each other, as shown in FIG. 8.

Figure 9:
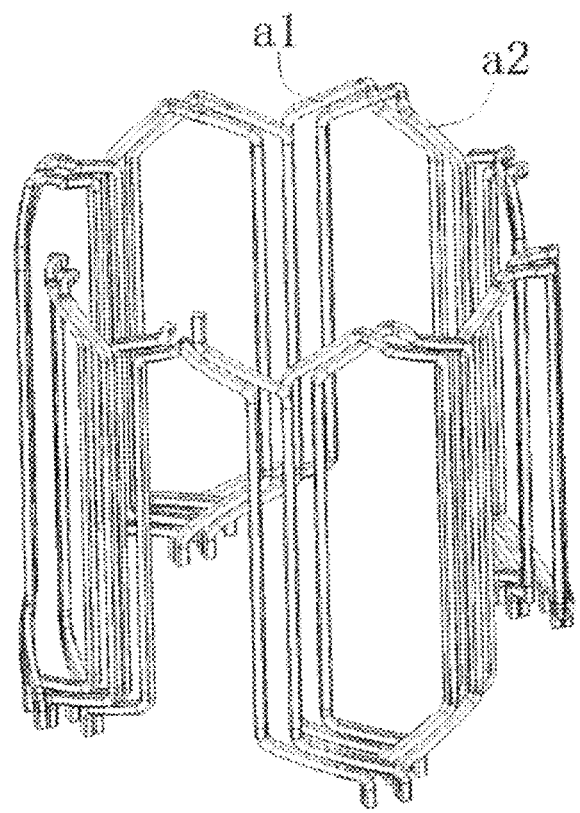
FIG. 9 shows a branch formed by connecting the coil ring a1 and the coil ring a2 in series in the first embodiment.
Figure 10:
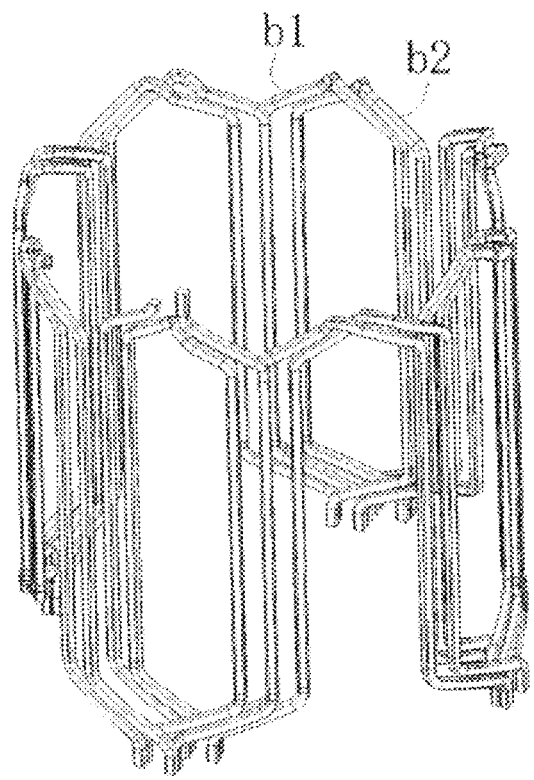
FIG. 10 shows a branch formed by connecting the coil ring b1 and the coil ring b2 in series in the first embodiment.
Figure 11:
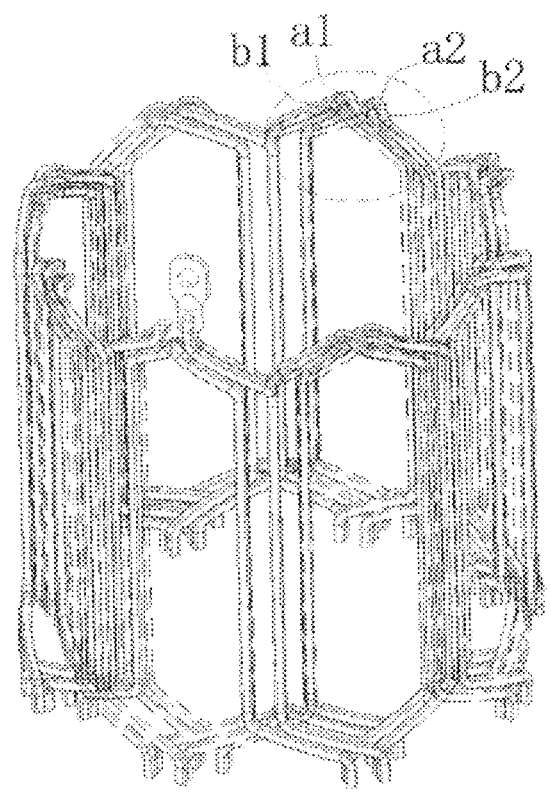
FIG. 11 is a schematic structural view of one phase winding in the first embodiment.
Figure 12:
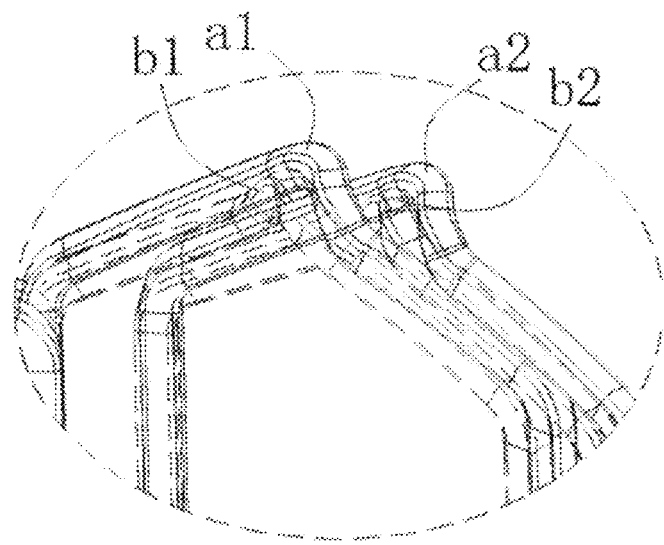
FIG. 12 is an enlarged schematic structure view at the circle in FIG. 11.

In this embodiment, the coil ring a1 and the coil ring a2 in the coil ring group a are connected in series to form a branch, as shown in FIG. 9. The coil ring b1 and the coil ring b2 in the coil ring group b are connected in series to form another branch, as shown in FIG. 10. Therefore, two parallel branches are formed, as shown in FIG. 11 and FIG. 12. The solid line in FIG. 11 represents the branch formed by the series connection of the coil ring a1 and the coil ring a2 in FIG. 9, the dotted line represents the branch formed by the series connection of the coil ring b1 and the coil ring b2 in FIG. 10. The viewing angles of FIG. 9, FIG. 10 and FIG. 11 are exactly the same, as can be seen from the positions in FIG. 9 and FIG. 10 corresponding to the circle in FIG. 11, the hairpin conductors of the coil rings a1 and a2 at the circle are wave-like conductors, and the hairpin conductors of the coil rings b1 and b2 at the circle are O-shaped conductors. FIG. 12 is an enlarged schematic structure view at the circle in FIG. 11. It can be seen from FIG. 12 that the O-shaped conductor of the coil ring b1 and the wave-like conductor of the coil ring a1 are arranged side by side and close to each other in a radial direction; the O-shaped conductor of the coil ring b2 and the wave-like conductor of the coil ring a2 are arranged side by side and close to each other in the radial direction.

Figure 13:
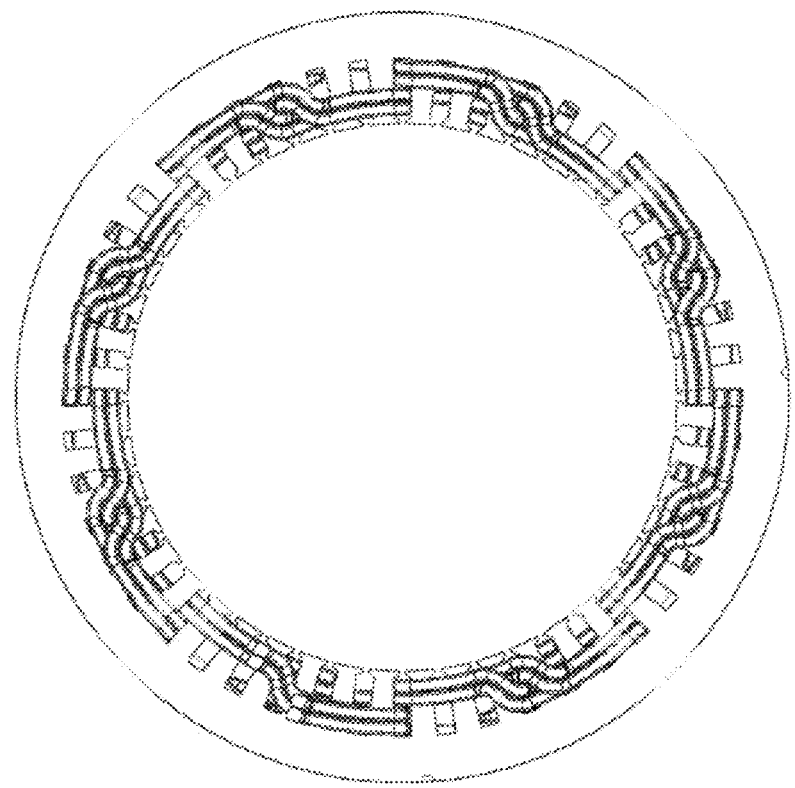
FIG. 13 is a schematic view of a coronal side of the stator mounted with one phase winding in the first embodiment.
Figure 14:
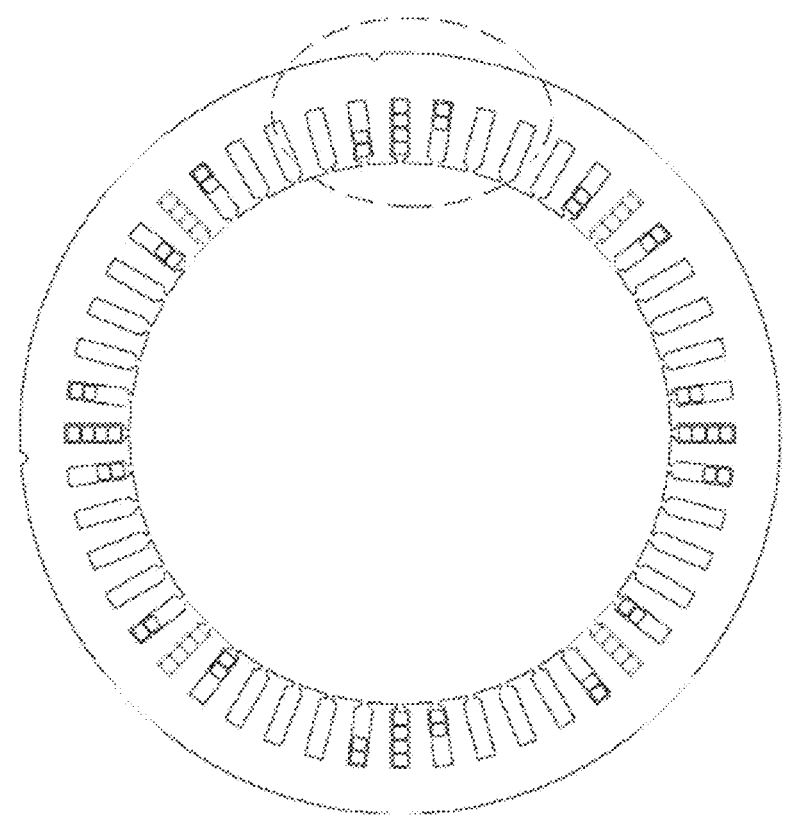
FIG. 14 is a schematic structural view of the cross section of FIG. 13.
Figure 15:
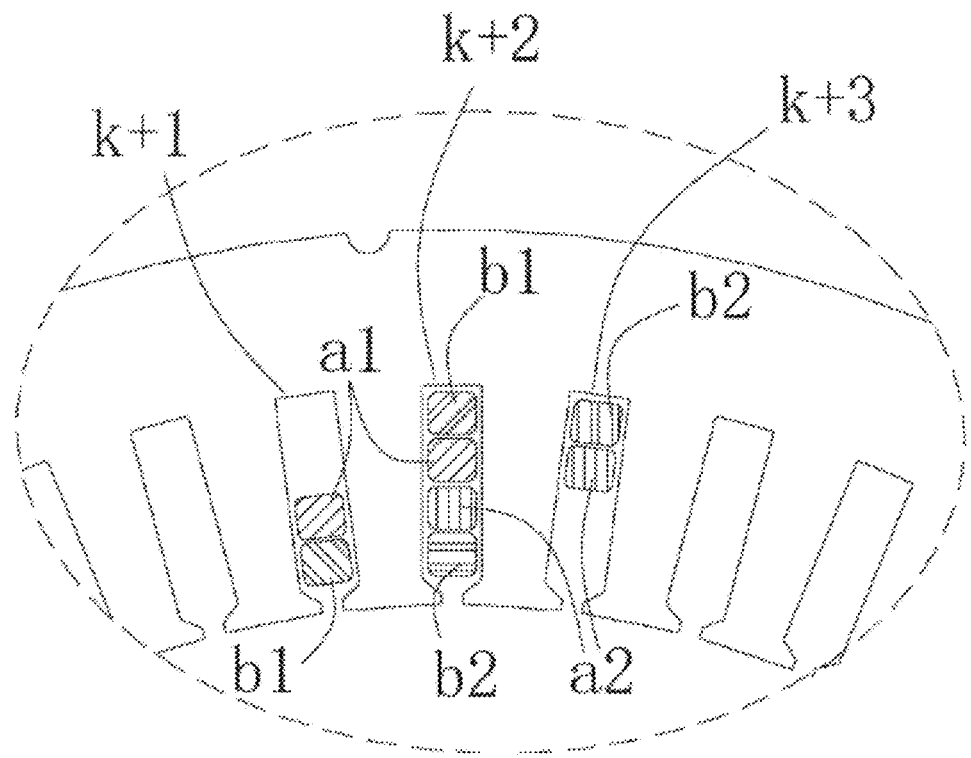
FIG. 15 is a schematic structure view at the circle in FIG. 14.
Figure 16:
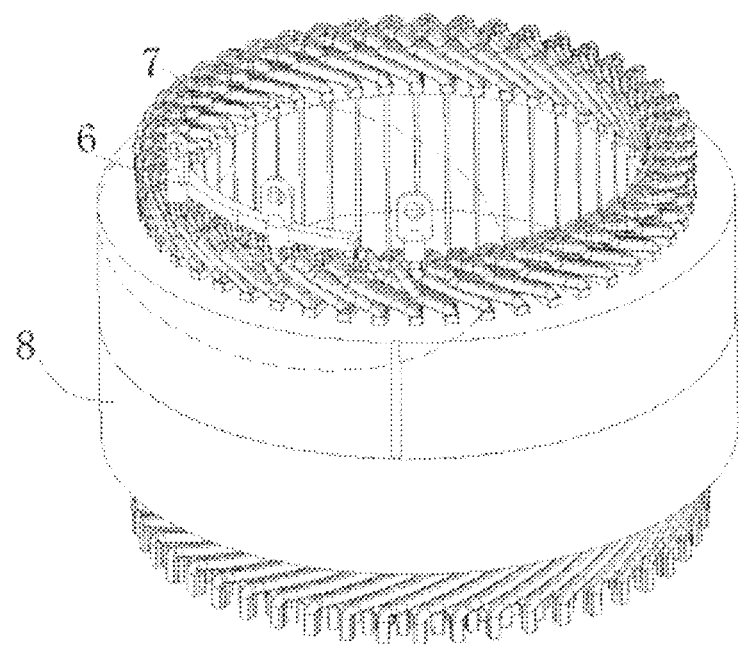
FIG. 16 is a schematic structural view of the stator in the second embodiment.
Figure 17:
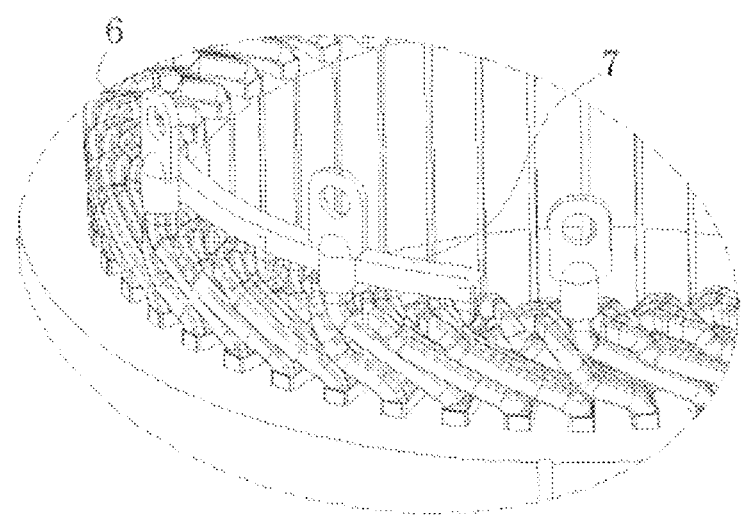
FIG. 17 is an enlarged schematic structural view at the circle in FIG. 16.
Figure 18:
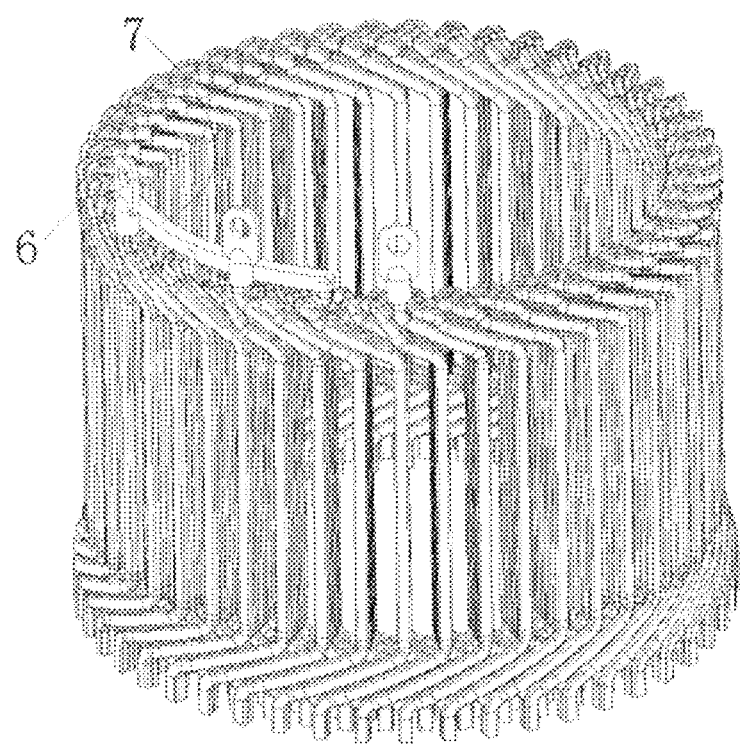
FIG. 18 is a schematic structural view of three phase windings in the second embodiment.

In addition, as shown in FIG. 13 and FIG. 14, in this embodiment, on the same hairpin conductor group, the two support leg parts of the wave-like conductor and the O-shaped conductor located in the adjacent slots are respectively located in the second layer and the third layer in the respective slots, the other two support leg parts of the wave-like conductor and the O-shaped conductor are respectively located in the first layer and the fourth layer in the respective slots. For the convenience of description, as shown in FIG. 15, taking the coil ring group a as an example, in the coil ring group a, the two adjacent support leg parts on the hairpin conductor group of the coil ring a1, are respectively located in the second layer of the (k+1)th slot and the third layer of the (k+2)th slot, the two adjacent support leg parts on the hairpin conductor group of the coil ring a2 adjacent to the coil ring a1, are respectively located in the second layer of the (k+2)th slot and the third layer of the (k+3)th slot, the first layers in the (k+1)th slot and the (k+2)th slot are respectively filled by the support leg parts of the hairpin conductors on the coil rings b1 and b2 arranged side by side on a counterclockwise side of the hairpin conductor group, and the fourth layers in the (k+2)th slot and the (k+3)th slot are respectively filled by the support leg parts of the hairpin conductors on the coil rings b1 and b2 arranged side by side on a clockwise side of the hairpin conductor group. In this way, in the phase winding, in each pole, the slot in the middle (i.e., (k+2)th slot) is completely filled with the support leg parts of the hairpin conductors belonging to the same phase, and in the slots (i.e., (k+1)th slot and (k+3)th slot) on two sides of the slot in the middle (i.e., (k+2)th slot), only half of the slot close to an inner layer or outer layer of the stator is filled with support leg parts of the hairpin conductors belonging to this phase, the other half of the slot is filled with the support leg parts of the hairpin conductors belonging to another adjacent phase winding, as shown in FIG. 15. In this way, two adjacent phase windings are close to each other in the same stator iron core slot at one surface, which reduces the adjoining area of conductors between different phases in the same slot, and is conducive to reducing the probability of inter-phase discharge and prolonging the service life of the motor. Furthermore, as can be seen from FIG. 1, the arrangement of hairpin conductors can be more orderly and the structure is more reasonable by adopting the solution of the present application.

Second Embodiment

As shown in FIG. 16 to FIG. 27, similar to the first embodiment, the number of slots per pole and phase is Q, Q=2, the number of pole pairs is P, P=4. That is, each phase winding includes two coil ring groups each consisting of two coil rings which respectively are a coil ring group a and a coil ring group b; the coil ring group a includes a coil ring a1 and a coil ring a2 arranged in sequence in the clockwise direction, and the coil ring a1 and the coil ring a2 are located in two consecutively adjacent slots in the circumferential direction of the stator. The coil ring group b includes a coil ring b1 and a coil ring b2 arranged in sequence in the clockwise direction, and the coil ring b1 and the coil ring b2 are also located in two consecutively adjacent slots in the circumferential direction of the stator.

This embodiment differs from the first embodiment mainly in that: in an assembly state, six support leg parts are arranged in each stator core slot.

Figure 21:
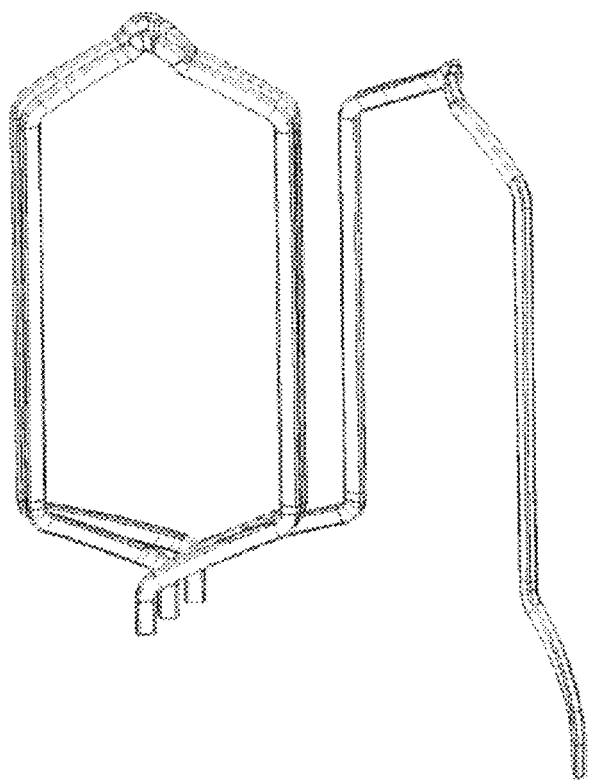
FIG. 21 is a schematic structural view of the hairpin conductor group in the second embodiment.

In this embodiment, the hairpin conductor group includes three hairpin conductors, one hairpin conductor is a wave-like conductor, and the other two hairpin conductor are integrally annular O-shaped conductors. The wave-like conductor and the O-shaped conductor each include a hairpin body which as a whole is bent into a U-shape, the hairpin body includes two support leg parts arranged in parallel and a head part connected to one end of the two support leg parts, and the two support leg parts are each provided with a support foot at another end. Two support feet of the wave-like conductor are skewed and bent away from each other in a width direction of the hairpin body, as shown in FIG. 6. Two support feet of the O-shaped conductor are skewed and bent toward the middle portion in the width direction of the hairpin body, and are spaced apart in a staggered manner in a thickness direction of the hairpin body, as shown in FIG. 7. The two O-shaped conductors are arranged side by side and spaced apart from each other in the radial direction of the stator, two adjacent support leg parts of the wave-like conductor and the O-shaped conductor are located in two adjacent slots respectively, and the other support leg parts of the wave-like conductor and the O-shaped conductor face away from each other, as shown in FIG. 21.

Figure 19:
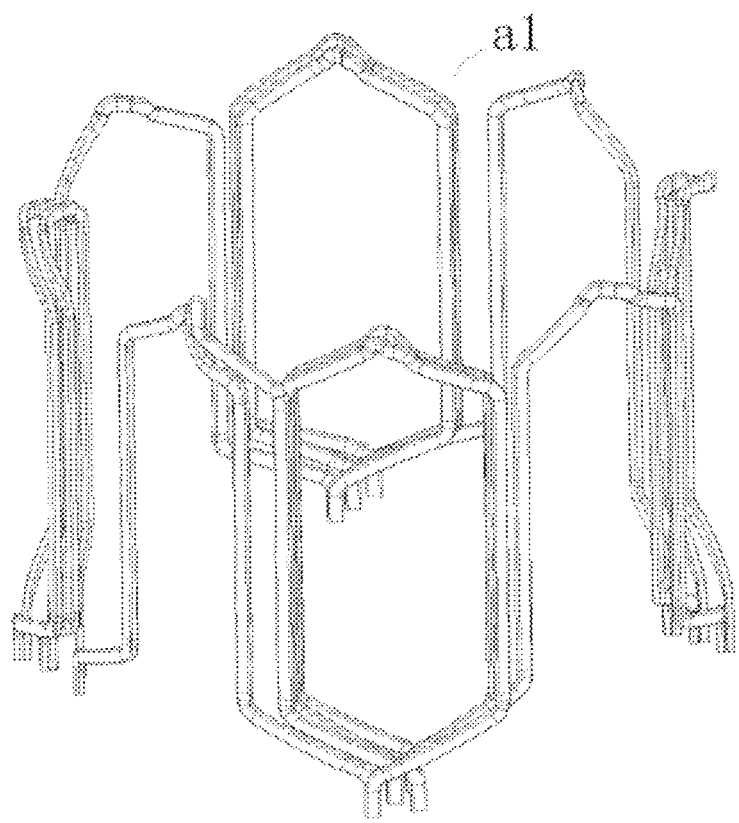
FIG. 19 is a structural view of coil ring a1 in the second embodiment.
Figure 20:
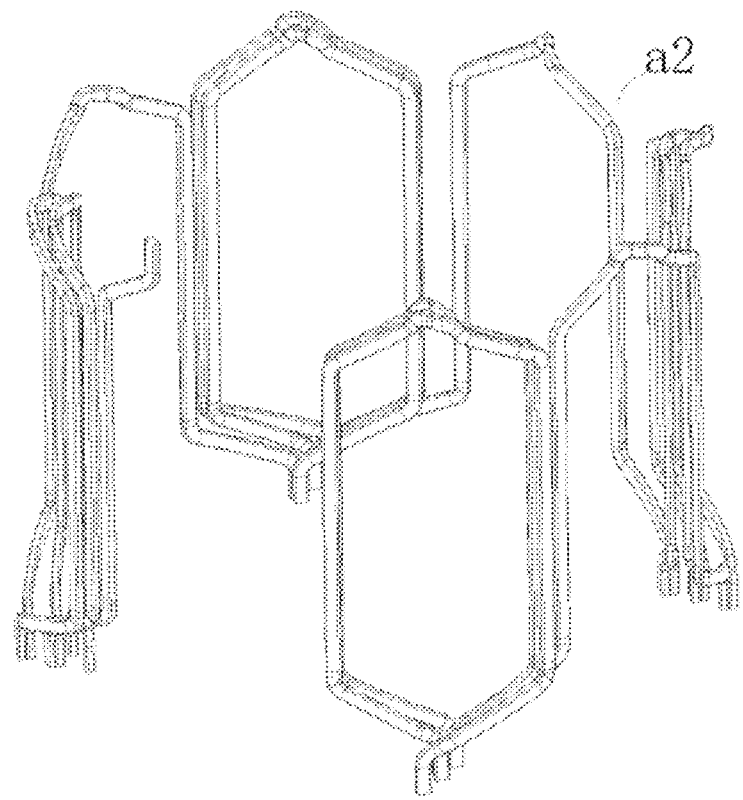
FIG. 20 is a structural view of coil ring a2 in the second embodiment.
Figure 22:
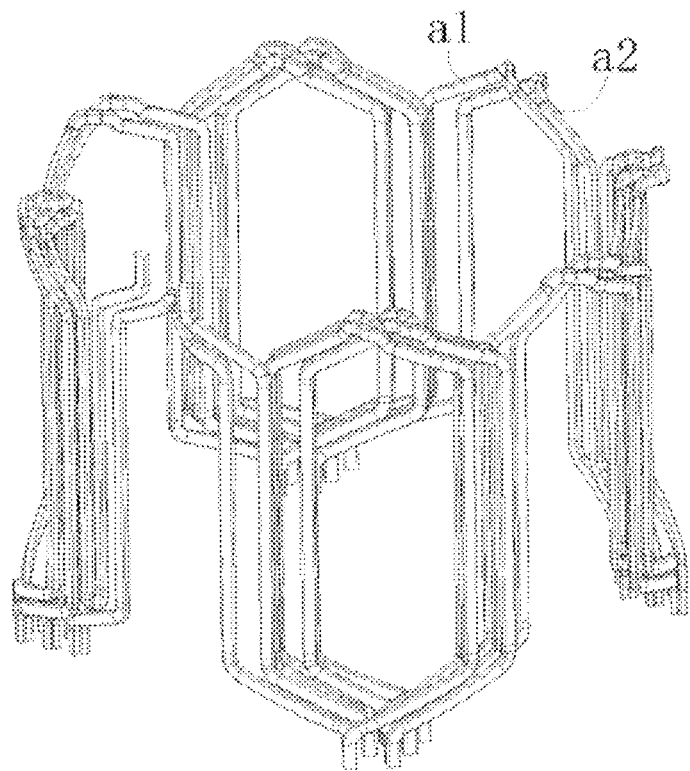
FIG. 22 shows a branch formed by connecting the coil ring a1 and the coil ring a2 in series in the second embodiment.
Figure 23:
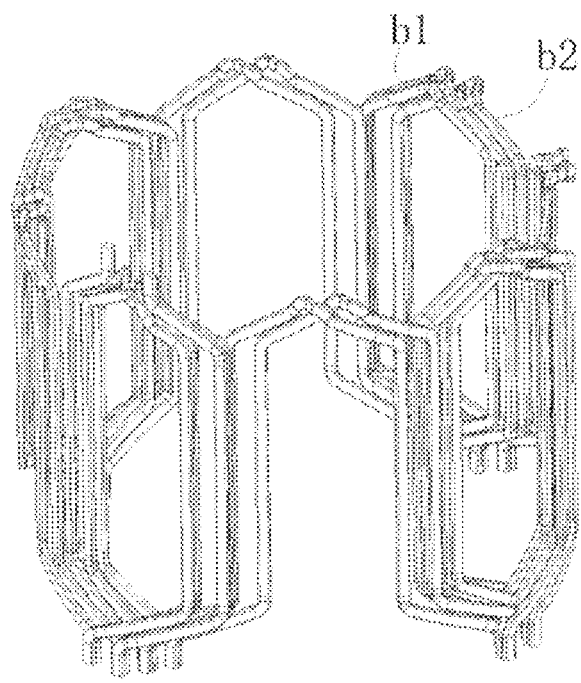
FIG. 23 shows a branch formed by connecting the coil ring b1 and the coil ring b2 in series in the second embodiment.
Figure 24:
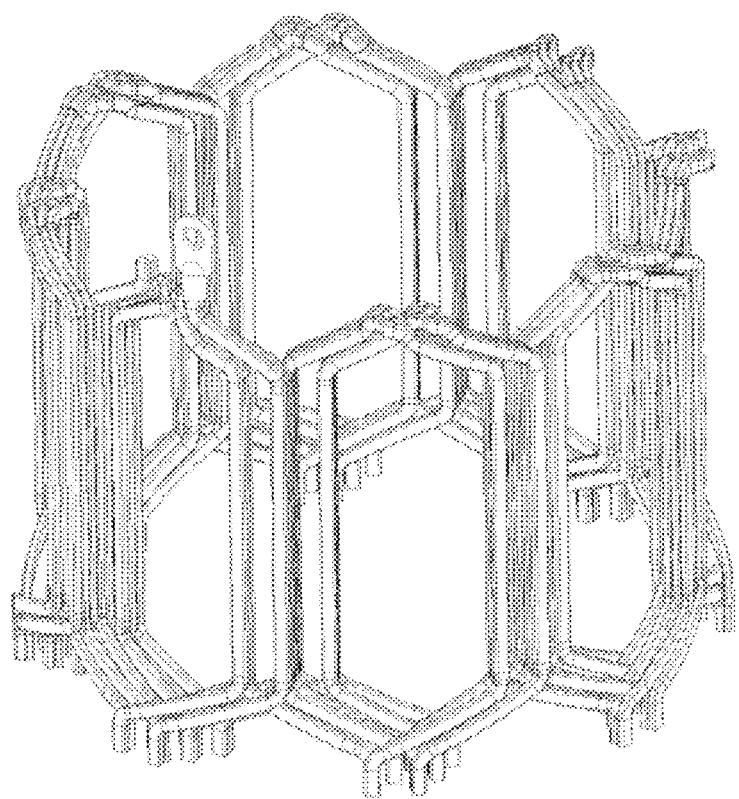
FIG. 24 is a schematic structural view of one phase winding in the second embodiment.

As shown in FIG. 19, FIG. 20, and FIG. 22, the coil ring a1 and the coil ring a2 in the coil ring group a are connected in series to form a branch. As shown in FIG. 23, the coil ring b1 and the coil ring b2 in the coil ring group b are connected in series to form another branch, forming two parallel branches, as shown in FIG. 24.

Figure 25:
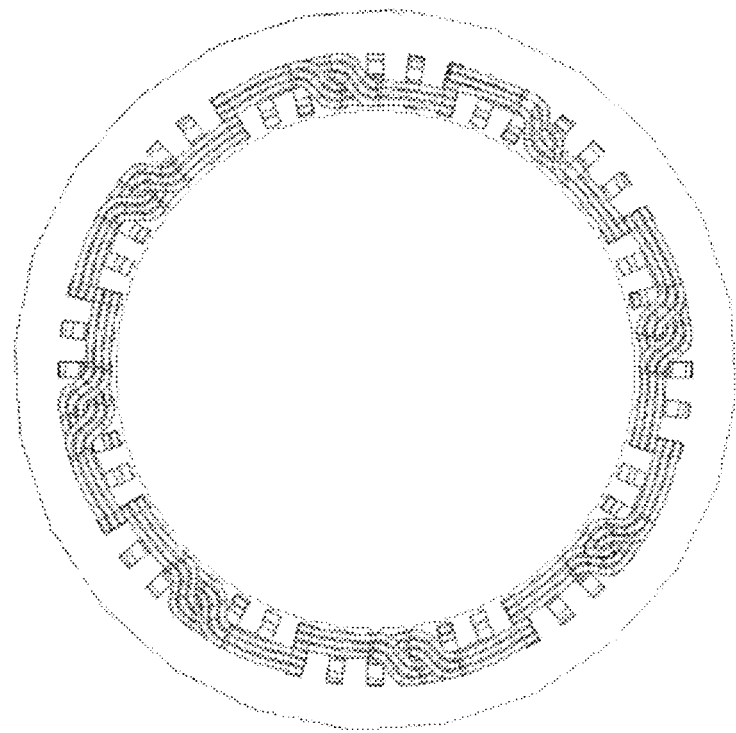
FIG. 25 is a schematic view of the coronal side of the stator mounted with one phase winding in the second embodiment.
Figure 26:
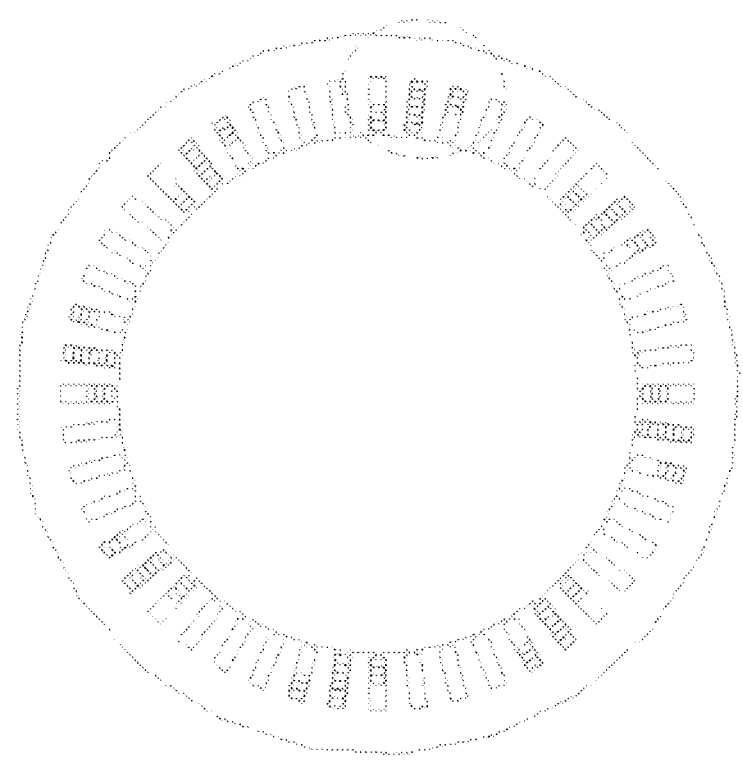
FIG. 26 is a schematic structural view of the cross section of FIG. 25.
Figure 27:
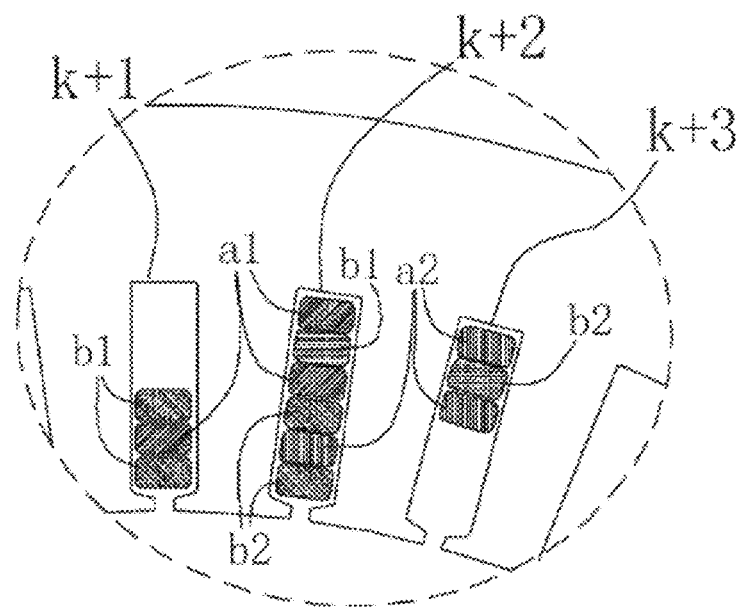
FIG. 27 is a schematic structure view at the circle in FIG. 26.

In addition, as shown in FIG. 25 and FIG. 26, in this embodiment, on the same hairpin conductor group, three support leg parts of the wave-like conductor and the two O-shaped conductor arranged side by side, are respectively located in the second layer, the fourth layer, and the sixth layer in two adjacent slots, the other three support leg parts of the wave-like conductor and the O-shaped conductors are respectively located in the fifth layer, the third layer, and the first layer in respective slots. For the convenience of description, as shown in FIG. 15, taking the coil ring group a as an example, in the coil ring group a, the adjacent support leg parts on the hairpin conductor group of the coil ring a1, are respectively located in the second layer of the (k+1)th slot, and the fourth layer and the sixth layer of the (k+2)th slot, the adjacent support leg parts on the hairpin conductor group of the coil ring a2 adjacent to the coil ring a1, are respectively located in the second layer of the (k+2)th slot, and the fourth layer and the sixth layer of the (k+3)th slot, the first layers and the third layers in the (k+1)th slot and the (k+2)th slot are respectively filled by the support leg parts of the O-shaped conductors on the coil rings b1 and b2 arranged side by side on a counterclockwise side of the hairpin conductor group, and the sixth layers in the (k+2)th slot and the (k+3)th slot are respectively filled by the support leg parts of the wave-like conductors on the coil rings b1 and b2 on a clockwise side of the hairpin conductor group. In this way, in the phase winding, in each pole, the slot in the middle (i.e., (k+2)th slot) is completely filled with the support leg parts of the hairpin conductors belonging to the same phase, and in the slots (i.e., (k+1)th slot and (k+3)th slot) on two sides of the slot in the middle (i.e., (k+2)th slot), only half of the slot close to an inner layer or outer layer of the stator is filled with support leg parts of the hairpin conductors belonging to this phase, the other half of the slot is filled with the support leg parts of the hairpin conductors belonging to another adjacent phase winding, as shown in FIG. 27. In this way, two adjacent phase windings are close to each other in the same stator iron core slot at one surface, which reduces the adjoining area of conductors between different phases in the same slot, and is conducive to reducing the probability of inter-phase discharge and prolonging the service life of the motor. Furthermore, as can be seen from FIG. 1, the arrangement of hairpin conductors can be more orderly and the structure is more reasonable by adopting the solution of the present application.

Third Embodiment

Similar to the second embodiment, in the assembly state, six support leg parts are arranged in each stator core slot.

Figure 28:
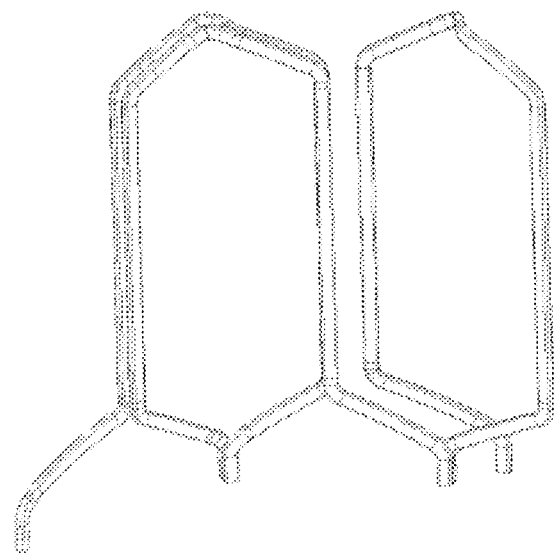
FIG. 28 is a schematic structural view of the hairpin conductor group in the third embodiment.
Figure 31:
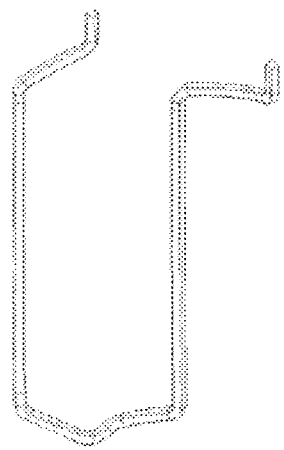
FIG. 31 is a schematic structural view of the first-type skewed U-shaped conductor.
Figure 32:
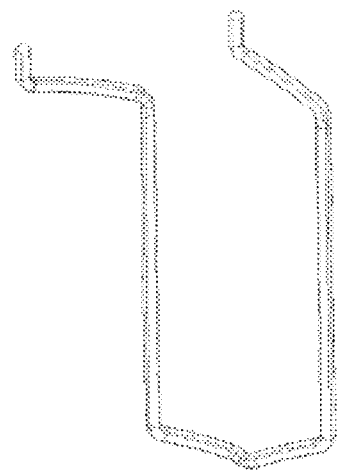
FIG. 32 is a schematic structural view of the second-type skewed U-shaped conductor.

This embodiment differs from the second embodiment mainly in that: as shown in FIG. 28, the hairpin conductor group includes three hairpin conductors. One hairpin conductor is the integrally annular O-shaped conductor. The rest two hairpin conductors are first-type skewed U-shaped conductor and second-type skewed U-shaped conductor arranged side by side and spaced apart from each other in the radial direction of the stator, as shown in FIG. 31 and FIG. 32. A support foot on one support leg part of the first-type skewed U-shaped conductor and a support foot on another support leg part of the second-type skewed U-shaped conductor are skewed and bent away from each other in the width direction of the hairpin body, and another two support feet of the first-type skewed U-shaped conductor and the second-type skewed U-shaped conductor are bent toward each other in the width direction of the hairpin body and are connected with each other; two support feet of the O-shaped conductor are skewed and bent toward the middle portion in the width direction of the hairpin body, and are spaced apart in a staggered manner in the thickness direction of the hairpin body; adjacent support leg parts of the first-type skewed U-shaped conductor, the second-type skewed U-shaped conductor, and the O-shaped conductor are located in adjacent slots.

Fourth Embodiment

This embodiment differs from the first embodiment mainly in that, in the assembly state, ten support leg parts are arranged in each stator core slot.

Figure 29:
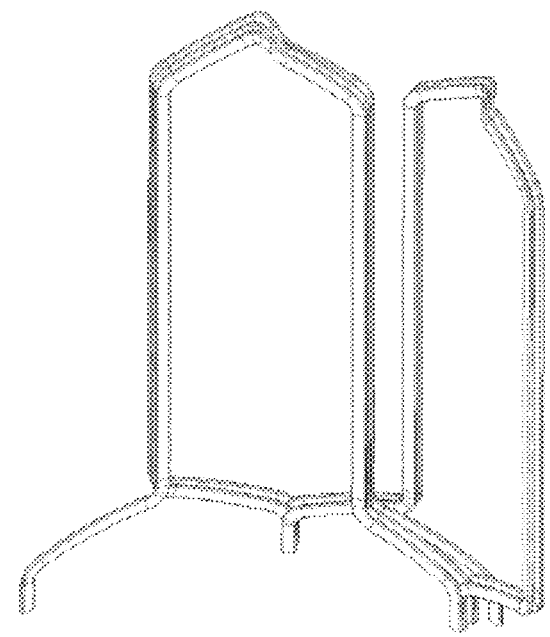
FIG. 29 is a schematic structural view of the hairpin conductor group in the fourth embodiment.

As shown in FIG. 29, the hairpin conductor group includes two first-type skewed U-shaped conductors arranged side by side and spaced apart from each other in the radial direction of the stator, two second-type skewed U-shaped conductors arranged side by side and spaced apart from each other in the radial direction of the stator, and one wave-like conductor arranged side by side and spaced apart from the first-type skewed U-shaped conductor or the second-type skewed U-shaped conductor in the radial direction of the stator; two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in the width direction of the hairpin body, and two support feet of the second-type skewed U-shaped conductor are skewed and bent toward the first-type skewed U-shaped conductor in the width direction of the hairpin body.

Fifth Embodiment

Figure 30:
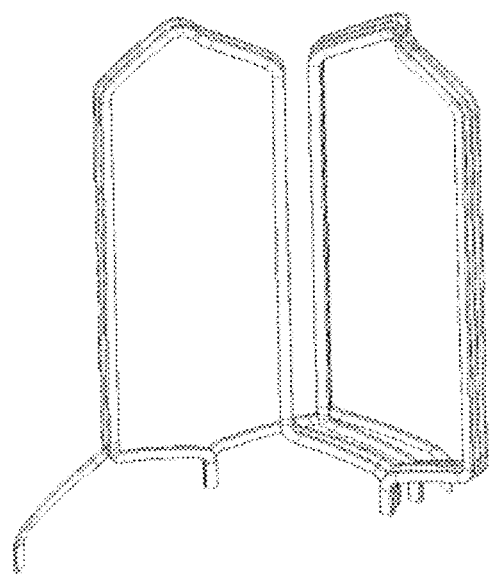
FIG. 30 is a schematic structural view of the hairpin conductor group in the fifth embodiment.

This embodiment differs from the fourth embodiment mainly in that, as shown in FIG. 30, the hairpin conductor group includes the first-type skewed U-shaped conductor and the second-type skewed U-shaped conductor which are arranged in a staggered manner in the circumferential direction of the stator. Two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in the width direction of the hairpin body, and two support feet of the second-type skewed U-shaped conductor are skewed and bent toward the first-type skewed U-shaped conductor in the width direction of the hairpin body. The hairpin conductor group further includes the wave-like conductor arranged side by side and spaced apart from the first-type skewed U-shaped conductor in the radial direction of the stator, and two O-shaped conductors which are spaced apart from the second-type skewed U-shaped conductor in the radial direction of the stator. The two O-shaped conductors are respectively located on two sides of the second-type skewed U-shaped conductor.

The above only shows preferred embodiments of the present application, and is not intended to limit the present application. Any modifications, equivalent substitutions, improvements made within the spirit and principle of the present application should be included in the scope of protection of the present application.

The invention claimed is:

1. A side-by-side phase winding, comprising two coil ring groups each consisting of Q coil rings,
    wherein each of the coil rings is formed by connecting in series P hairpin conductor groups evenly distributed along a circumferential direction of a stator, P is the number of pole pairs, Q is the number of slots per pole and phase, and is an integer greater than 1; the hairpin conductor group comprises at least two hairpin conductors that are arranged in a staggered manner in the circumferential direction of the stator, the hairpin conductor comprises a hairpin body which as a whole is bent into a U-shape, the hairpin body comprises two support leg parts arranged in parallel and a head portion connected to one end of the two support leg parts, and the two support leg parts are each provided with a support foot at another end, and adjacent support leg parts on the hairpin conductors which are arranged in a staggered manner in the circumferential direction of the stator in the hairpin conductor group are located in two adjacent slots;
    the Q coil rings in each group of the coil rings are arranged in the consecutive adjacent Q slots in the circumferential direction of the stator; in a clockwise direction, the hairpin conductor group on the coil ring in the Ath slot in one coil ring group and the hairpin conductor group on the coil ring in the Ath slot in another coil ring group are arranged in a staggered manner in the circumferential direction of the stator, and adjacent hairpin conductors in the two hairpin conductor groups that are arranged in a staggered manner from each other on the two coil rings are arranged side by side in a radial direction of the stator to be closely adjacent to each other.

2. The side-by-side phase winding according to claim 1, wherein in an assembly state, 2N support leg parts are arranged in each stator core slot, and N is two or an odd number greater than two.

3. The side-by-side phase winding according to claim 1, wherein in an assembly state, four support leg parts are arranged in each stator iron core slot, and the hairpin conductor group comprises two hairpin conductors, one hairpin conductor is a wave-like conductor with two support feet skewed and bent away from each other in a width direction of the hairpin body, the other hairpin conductor is an integrally annular O-shaped conductor, two support feet of the O-shaped conductor are skewed and bent toward the middle part in the width direction of the hairpin body, and are spaced apart in a staggered manner in a thickness direction of the hairpin body; two adjacent support leg parts of the wave-like conductor and the O-shaped conductor are located in adjacent slots, and the other support leg parts of the wave-like conductor and the O-shaped conductor face away from each other.

4. The side-by-side phase winding according to claim 1, wherein in an assembly state, six support leg parts are arranged in each stator iron core slot, and the hairpin conductor group comprises three hairpin conductors, one hairpin conductor is a wave-like conductor with two support feet skewed and bent away from each other in a width direction of the hairpin body, each of the rest two hairpin conductors is an integrally annular O-shaped conductor, two support feet of the O-shaped conductor are skewed and bent toward the middle portion in a width direction of the hairpin body, and are spaced apart in a staggered manner in a thickness direction of the hairpin body; the two O-shaped conductors are arranged side by side and spaced apart from each other in the radial direction of the stator; two adjacent support leg parts of the wave-like conductor and the O-shaped conductor are located in adjacent slots, and the other support leg parts of the wave-like conductor and the O-shaped conductor face away from each other.

5. The side-by-side phase winding according to claim 1, wherein in an assembly state, six support leg parts are arranged in each stator iron core slot, and the hairpin conductor group comprises three hairpin conductors, one hairpin conductor is an integrally annular O-shaped conductor, the rest two hairpin conductors are first-type skewed U-shaped conductor and second-type skewed U-shaped conductor arranged side by side and spaced apart from each other in the radial direction of the stator, a support foot on one support leg part of the first-type skewed U-shaped conductor and a support foot on another support leg part of the second-type skewed U-shaped conductor are skewed and bent away from each other in a width direction of the hairpin body, and another two support feet of the first-type skewed U-shaped conductor and the second-type skewed U-shaped conductor are bent toward each other in the width direction of the hairpin body and are connected with each other; two support feet of the O-shaped conductor are skewed and bent toward the middle portion in a width direction of the hairpin body, and are spaced apart in a staggered manner in the thickness direction of the hairpin body; adjacent support leg parts of the first-type skewed U-shaped conductor, the second-type skewed U-shaped conductor, and the O-shaped conductor are located in adjacent slots.

6. The side-by-side phase winding according to claim 1, wherein in an assembly state, ten support leg parts are arranged in each stator iron core slot, and the hairpin conductor group comprises two first-type skewed U-shaped conductors arranged side by side and spaced apart from each other in the radial direction of the stator, two second-type skewed U-shaped conductors arranged side by side and spaced apart from each other in the radial direction of the stator, and one wave-like conductor arranged side by side and spaced apart from the first-type skewed U-shaped conductor or the second-type skewed U-shaped conductor in the radial direction of the stator; two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in a width direction of the hairpin body, and two support feet of the second-type skewed U-shaped conductor are skewed and bent toward the first-type skewed U-shaped conductor in the width direction of the hairpin body.

7. The side-by-side phase winding according to claim 1, wherein in an assembly state, ten support leg parts are arranged in each stator iron core slot, and the hairpin conductor group comprises a first-type skewed U-shaped conductor and a second-type skewed U-shaped conductor which are arranged in a staggered manner in the circumferential direction of the stator, two adjacent support leg parts of the first-type skewed U-shaped conductor and the second-type skewed U-shaped conductor are located in adjacent slots, two support feet of the first-type skewed U-shaped conductor are skewed and bent toward the second-type skewed U-shaped conductor in a width direction of the hairpin body, and two support feet of the second-type skewed U-shaped conductor are skewed and bent toward the first-type skewed U-shaped conductor in the width direction of the hairpin body, the hairpin conductor group further comprises the wave-like conductor arranged side by side and spaced apart from the first-type skewed U-shaped conductor or the second-type skewed U-shaped conductor in the radial direction of the stator, and two O-shaped conductors which are spaced apart from the second-type skewed U-shaped conductor or the first-type skewed U-shaped conductor in the radial direction of the stator, and the two O-shaped conductors are respectively located on two sides of the second-type skewed U-shaped conductor or the first-type skewed U-shaped conductor.

8. A stator, comprising a stator iron core and a plurality of circuits of the side-by-side phase windings according to claim 1 mounted on the stator iron core, wherein connecting ends of the plurality of circuits of the side-by-side phase windings for connecting with a power supply are respectively connected with power supply terminals, and connecting ends of the plurality of circuits of the side-by-side phase windings for connecting with a star point are welded by a star point connecting conductor.

9. A motor, comprising the stator according to claim 8.

* * * * *